| United States Patent [19] | [11] Patent Number: 5,071,807 |
|---|---|
| Kennedy et al. | [45] Date of Patent: Dec. 10, 1991 |

[54] HYDROCARBON PROCESSING COMPOSITION

[75] Inventors: James V. Kennedy, Greenbrae; Lawrence W. Jossens, Albany, both of Calif.

[73] Assignee: Chevron Research Company, San Francisco, Calif.

[21] Appl. No.: 590,538

[22] Filed: Sep. 27, 1990

Related U.S. Application Data

[63] Continuation of Ser. No. 459,092, Dec. 29, 1989, abandoned.

[51] Int. Cl.$^5$ ............................................. B01J 21/16
[52] U.S. Cl. .................................... 502/84; 502/251; 502/340; 502/353
[58] Field of Search ................ 502/84, 251, 340, 353; 208/216 PP

[56] References Cited

U.S. PATENT DOCUMENTS

| 4,196,102 | 4/1980 | Inouka et al. | 502/74 |
|---|---|---|---|
| 4,343,723 | 8/1982 | Rogers et al. | 502/64 |
| 4,439,312 | 3/1984 | Asaoka et al. | 208/216 PP |
| 4,465,779 | 8/1984 | Occelli et al. | 502/68 |
| 4,466,884 | 8/1984 | Occelli et al. | 208/120 |
| 4,707,461 | 11/1987 | Mitchell et al. | 502/64 |

Primary Examiner—Anthony McFarlane
Assistant Examiner—Nhat Phan

[57] ABSTRACT

A composition useful for processing hydrocarbonaceous feedstocks is disclosed comprising a mixture of a calcium/magnesium-containing material and a magnesium-containing material. The preferred calcium/magnesium-containing material is dolomite and the preferred magnesium-containing material is sepiolite.

8 Claims, No Drawings

5,071,807

HYDROCARBON PROCESSING COMPOSITION

This application is a continuation of application Ser. No. 459,092, filed Dec. 29, 1989 now abandoned.

FIELD OF THE INVENTION

This invention relates to a composition for use in the conversion of hydrocarbons to lower-boiling fractions. More particularly, the invention comprises a material, preferably formed into particles, primarily useful as a heavy metals trap, and also useful as diluent, octane enhancer, or sulfur oxide removal means in hydrocarbon processing, particularly catalytic cracking. The material comprises components including a calcium-containing material and a magnesium-containing material.

In ordinary catalytic cracking processes, various metallic contaminants which may be present in hydrocarbonaceous feedstock, particularly vanadium, nickel and iron, cause the degradation and/or deactivation of the catalytic cracking catalyst. Particularly susceptible to vanadium contamination are crystalline aluminosilicate zeolites, either natural or synthetic. This deactivation causes distillate yield loss, particularly through loss of active acid cracking sites, as well as metal poisoning via secondary dehydrogenation and coking reactions caused by the deposition of these heavy metals on the catalyst. Remedial technology has evolved in various ways to deal with this metals contaminant problem. One mechanism which has evolved includes the use of various diluents as metals passivators or traps, which contain materials which will chemically combine with and effectively tie up the offending materials. These traps have proved particularly effective with regard to vanadium.

One particular strategy involves the use of dual particle systems wherein the cracking catalyst, usually zeolite, is contained on one particle or component of the system, and a diluent or vanadium trap is contained as a separate, distinct entity on a second particle or component of the system. U.S. Pat. No. 4,465,588, Occelli et al., discloses a process for cracking high metals content feedstock using a novel catalyst cracking composition comprising a solid cracking catalyst and a separate and distinct diluent containing materials selected from a selected magnesium compound or a selected magnesium compound in combination with one or more heat-stable metal compounds. Among the magnesium-containing compounds specified is magnesium clay sepiolite. U.S. Pat. No. 4,465,779 teaches the cracking catalyst of '588 itself. U.S. Pat. No. 4,615,996, Occelli, teaches a dual-function cracking catalyst composition comprising a solid cracking catalyst and a separate, distinct particle diluent containing substantially catalytically inactive crystalline aluminosilicate. U.S. Pat. No. 4,466,884, Occelli et al., teaches a process wherein the separate and distinct entity diluent contains antimony and/or tin, supported on a inert base selected from the group consisting of magnesium-containing clay minerals, including sepiolite. U.S. Pat. No. 4,650,564, Occelli et al., also teaches a process for cracking high metals content feedstock comprising contacting the feed with a dual particle catalyst cracking composition comprising a solid cracking catalyst and, as a separate and distinct entity, an alumina diluent. U.S. Ser. No. 909,819, Occelli et al., also teaches a dual particle catalytic cracking system comprising a cracking catalyst and a second component comprising magnesium oxide. U.S. Pat. No. 4,707,461, Mitchell et al., discloses a catalyst composition comprising zeolite, matrix, and a calcium-containing additive comprising substantially amorphous calcium silicate as a separate and discrete component. A preferred calcium additive component comprises dolomite.

SUMMARY OF THE INVENTION

The present invention comprises a material useful in hydrocarbon processing, and especially useful as the second particle in a dual particle catalyst system for use in catalytic cracking. This material, among other factors, demonstrates prevention of activity dilution and good sulfur tolerance. The material comprises calcium/magnesium-containing material in combination with magnesium-containing material, wherein the calcium/magnesium-containing compound and is especially appropriate for metals trapping, especially vanadium trapping. The material is preferable bound together with a binding material and formed into discrete particles. The preferred calcium/magnesium-containing material is dolomite and the preferred magnesium-containing material is sepiolite.

DETAILED DESCRIPTION OF THE INVENTION

The composition of the present invention comprises a material useful for hydrocarbon processing, and especially having an effectiveness for metals passivation, wherein said composition comprises a calcium-containing material admixed with a magnesium-containing material.

The material of the present invention compositionally comprises two different compounds or components, and is preferably held together by a binder to impart structural integrity. The first component comprises a magnesium-containing compound, preferably a hydrous magnesium silicate, which may act as a matrix for the material when formed into particles, providing the medium for the second component to disperse within the material as a whole. The preferred magnesium-containing compounds comprise hydrous magnesium silicate, more preferably sepiolite, (most preferably Spanish sepiolite), attapulgite, talc and Calkate T-21, a synthetic version of sepiolite. It is preferred that the magnesium compound be in crystalline form, and low in both iron, potassium and sodium.

The second component comprises a calcium-containing material, in particular a calcium and magnesium containing material, which, under conditions found in catalytic cracking processes, transforms into active components. This second subcomponent is believed to be the active component of the material diluent, and particularly provides the vanadium trapping activity appropriate to the effectiveness of the present invention.

The preferred calcium additive materials comprise dolomite, substantially amorphous calcium-magnesium silicate, calcium-magnesium oxide, calcium-magnesium acetate, and calcium-magnesium carbonate or subcarbonate. The most preferred material is dolomite.

The combination of the calcium-containing material and the magnesium-containing material and, in particular, the combination of dolomite and sepiolite, provides a material with a high calcium-magnesium composition, which is particularly effective for vanadium trapping and which is at the same time is attrition resistant and not so friable as to create process difficulties in catalytic cracking units. Moreover, the minerals involved, in particular dolomite, are relatively inexpensive, particularly relative to the zeolite component of the catalyst generally, thereby providing an economic advantage in view of the vanadium trapping efficiency of the diluent component. It is also believed that the material is useful as an octane enhancer in catalytic cracking processes and may also be effective as a sulfur oxide adsorber in fluid catalytic cracking.

The ratio of the two material one to the other is also a factor in the effectiveness of the material. It is preferred that the the calcium/magnesium-containing material and the magnesium-containing material be present in a weight ratio of from about 20:80 to about 80:20 calcium/magnesium-containing material to magnesium-containing material. More preferably, the ratio is from about 50:50 to about 70:30.

While the specific mechanism by which the material may trap contaminants in catalytic cracking is not claimed as part of the present invention, one possible mechanism is suggested as follows. When fresh hydrocarbon feed contacts catalyst in the cracking zone, cracking and coking reactions occur. At the same time, vanadium is quantitatively deposited on the catalyst. Spent catalyst containing vanadium deposits passes from the cracking unit to the regenerator where temperatures normally in the range of 1150°-1400° F. (621°-760° C.) are encountered in an oxygen/steam-containing environment. Conditions are therefore suitable for vanadium migration to and reaction with the active zeolitic component of the catalyst. The reaction results in formation of mixed metal oxides containing vanadium which causes irreversible structural collapse of the crystalline zeolite. Upon degradation, active sites are destroyed and catalytic activity declines. Activity can be maintained only by adding large quantities of fresh catalyst at great expense to the refiner.

It is theorized that addition of the calcium-containing additive prevents the vanadium interaction with the zeolite by acting as a trap or sink for vanadium. Moreover, it has shown to be surprisingly good at minimizing vanadium catalyzed dehydrogenation reactions, that is reducing hydrogen make and coke make. In the regenerator, vanadium present on the catalyst particles preferentially migrates to and reacts with the calcium/magnesium-containing passivator. Competitive reactions are occurring and the key for successful passivation is to utilize an additive with a significantly greater rate of reaction toward vanadium than that displayed by the zeolite. As a result, the vanadium is deprived of its mobility, and the zeolite is protected from attack and eventual collapse. It is believed that vanadium and the calcium/magnesium additive forms one or more new binary oxides. The overall result is greatly increased levels of permissible vanadium and lower fresh catalyst make-up rates.

Binder

It is also preferred to include a separate binder which binds together the components of the material. The binder provides additional strength and attrition resistance, as well as surface area and dispersion known to capture vanadium or other metals, i.e., large porosity.

The preferred embodiment of the present invention would include from 5 to 30% by weight of an inorganic binder. The binder is used to impart density and strength and maintain particle integrity of the material when formed into discrete particles. The inorganic binder can be those conventionally employed by those skilled in the art, including but not limited to clays such as kaolin, bentonite (montmorillonite), saponite and hectorite, or precipitated synthetic binders such as alumina, silica, silica-alumina, or derived from such standard commercially available materials as Catapal$^R$, Chlorohydrol$^R$, or SMM$^R$, or combinations thereof.

In the preferred embodiment, the concentrations of the subcomponents in the diluent component can range from a ratio by weight of 20:80 to 80:20 dolomite sepiolite, with the binder comprising between about 5% to 20% by weight. The most preferred composition comprises 50% dolomite, 40% sepiolite and 10% binder.

The amounts of the various components in a catalyst system using the claimed material are adapted to suit the needs of the particular feed being employed. In general, the material may comprise between 2% to 50% by weight of the entire circulating inventory, with the bulk of the remaining portion of the inventory comprising the active cracking catalyst. It is preferred that the diluent comprise between about 3% to 20% by weight of the circulating inventory, and most preferred, between about 5% to 10% by weight.

It is within the contemplation of the invention that other materials which improve the performance of the process may be also be included in a catalyst system employing the present material. These could include other known metals passivators, such as antimony, tin or bismuth, etc., and/or promoters, such as Platinum Group metals, and/or octane enhancers, such as ZSM-5, silicalite or beta zeolites. Suitable charge stocks for use in a hydrocarbon process employing the present invention include crude oil, residuums or other petroleums fractions which are suitable catalytic cracking charge stocks except for the high metals contents. A high metals content charge stock for purposes of this invention is defined as one having a total metals concentration equivalent to or greater than a value of 10 as calculated in accordance with the following relationship:

$$10[Ni]+[V]+[Fe] \geq 10$$

where [Ni], [V] and [Fe] are the concentrations of nickel, vanadium and iron, respectively, in parts per million by weight. The process is particularly advantageous when the charge stock metals concentration is equal to or greater than 100 in the above equation. The concentration of metals may also be expressed in terms of vanadium alone, preferably between about 2-10 ppm by weight vanadium, more preferably between about 3-5 ppm. The contaminants may also be expressed in terms of vanadium on the catalyst at equilibrium: i.e. between about 2000 to 10,000 ppm by weight, more preferably between about 3000-5000 ppm.

Typical feedstocks are heavy gas oils or the heavier fractions of crude oil in which the metal contaminants are concentrated. Particularly preferred charge stocks for treatment using the catalyst composition of this invention include deasphalted oils boiling above about 900° F. (482° C.) at atmospheric pressure; heavy gas oils boiling from about 600° F. to about 1100° F. (343° C. to 593° C.) at atmospheric pressure; atmospheric or vacuum tower bottoms boiling above about 650° F. The charge stocks can also be derived from coal, shale or tar sands.

The relative amounts of the catalytically active and material claimed in the present invention which may be introduced into a catalytic cracking system as make-up can be adjusted so as to increase the concentration of the diluent in the riser and in the system as the concentration of metal contaminants in the cracking zone increases. Accordingly, with the material acting as a scavenger for the metal contaminants, preventing such contaminants from reaching the cracking centers of the catalytically active component, the concentration of the material in the make-up catalyst can be adjusted so as to maintain a desired conversion, preferably a conversion of at least 55 percent. when the cracking catalyst composite (cracking component plus material) contains combined nickel, vanadium and iron contaminant concentrations in the range of 4000 to 20,000 ppm total metals (based upon the weight of the catalyst composite). The material is particularly effective in the scavenging of vanadium. It may also be advantageous to include other known metals passivators to further reduce the deleterious effects of the metals contaminants. Examples would include antimony oxide or bismuth oxide, in addition to the magnesium and calcium/magnesium compounds.

Reaction temperatures in accordance with processes using the present material may be at least about 900° F. (482° C.). The upper limit can be about 1100° F. (593.3° C.) or more. The preferred temperature range is about 950° F. to about 1050° F. (510° C. to 565.6° C.). The reaction total pressure can vary widely and can be, for example, about 5 to about 50 psig (0.34 to 3.4 atmospheres), or preferably, about 20 to about 30 psig (1.36 to 2.04 atmospheres). The maximum residence time is about 5 seconds, and for most charge stocks the residence time will be about 1.0 to about 2.5 seconds or less. For high molecular weight charge stocks, which are rich in aromatics, residence times of about 0.5 to about 1.5 seconds are suitable in order to crack mono- and di-aromatics and naphthenes which are the aromatics which crack most easily and which produce the highest gasoline yield, but to terminate the operation before appreciable cracking of polyaromatics occurs because these materials produce high yields of coke and $C_2$ and lighter gases. The length to diameter ratio of the reactor can vary widely, but the reactor should be elongated to provide a high linear velocity, such as about 25 to about 75 feet per second; and to this end a length to diameter ratio above about 20 to about 25 is suitable. The reactor can have a uniform diameter or can be provided with a continuous taper or a stepwise increase in diameter along the reaction path to maintain a nearly constant velocity along the flow path. The amount of material can vary depending upon the ratio of hydrocarbon to material desired for control purposes. If steam is the material employed, a typical amount to be charged can be 1-10 percent by weight, based on hydrocarbon charge. A suitable but non-limiting proportion of material gas, such as steam or nitrogen, to fresh hydrocarbon feed can be about 0.5 to about 10 percent by weight.

If formed into particles, the preferred particle size of the present material should render it capable of fluidization as a disperse phase in a fluid catalytic cracking reactor. Typical and non-limiting particle size characteristics are as follows,(These particle sizes are usual and are not peculiar to this invention.):

| Size (Microns) | 0–20 | 20–45 | 45–75 | >75 |
|---|---|---|---|---|
| Weight Percent | 0–5 | 20–30 | 35–55 | 20–40 |

In a typical FCC system employing the material of the present invention, a suitable weight ratio of catalyst to total oil charge is about 4:1 to about 25:1, preferably about 6:1 to about 10:1. The fresh hydrocarbon feed is generally preheated to a temperature of about 600° F. to about 700° F. (316° C. to 371° C.) but is generally not vaporized during preheat and the additional heat required to achieve the desired reactor temperature is imparted by hot, regenerated catalyst.

The weight ratio of catalyst to hydrocarbon in the feed is varied to affect variations in reactor temperature. Furthermore, the higher the temperature of the regenerated catalyst, the less catalyst is required to achieve a given reaction temperature. Therefore, a high regenerated catalyst temperature will permit the very low reactor density level set forth below and thereby help to avoid backmixing in the reactor. Generally catalyst regeneration can occur at an elevated temperature of about 1250° F. (676.6° C.) or more. Carbon-on-catalyst of the regenerated catalyst is reduced from about 0.6 to about 1.5, to a level of about 0.3 percent by weight. At usual catalyst to oil ratios, the quantity of catalyst is more than ample to achieve the desired catalytic effect and therefore if the temperature of the catalyst is high, the ratio can be safely decreased without impairing conversion. Since zeolitic catalysts, for example, are particularly sensitive to the carbon level on the catalyst, regeneration advantageously occurs at elevated temperatures in order to lower the carbon level on the catalyst to the stated range or lower. Moreover, since a prime function of the catalyst is to contribute heat to the reactor, for any given desired reactor temperature the higher the temperature of the catalyst charge, the less catalyst is required. The lower the catalyst charge rate, the lower the density of the material in the reactor. As stated, low reactor densities help to avoid backmixing.

The reactor linear velocity while not being so high that it induces turbulence and excessive backmixing, must be sufficiently high that substantially no catalyst accumulation or buildup occurs in the reactor because such accumulation itself leads to backmixing. (Therefore, the catalyst to oil weight ratio at any position throughout the reactor is about the same as the catalyst to oil weight ratio in the charge.) Stated another way, catalyst and hydrocarbon at any linear position along the reaction path both flow concurrently at about the same linear velocity. A buildup of catalyst in the reactor leads to a dense bed and backmixing, which in turn increases the residence time in the reactor, for at least a portion of the charge hydrocarbon induces after-cracking. Avoiding a catalyst buildup in the reactor results in a very low catalyst inventory in the reactor, which in turn results in a high space velocity. Therefore, a space velocity of over 100 to 200 weight of hydrocarbon per hour per weight of catalyst is highly desirable. The space velocity should not be below about 35 and can be as high as about 500. Due to the low catalyst inventory and low charge ratio of catalyst to hydrocarbon, the density of the material at the inlet of the reactor in the zone where the feed is charged can be only about 1 to less than 5 pounds per cubic foot, although these ranges are non-limiting. An inlet density in the zone where the low molecular weight feed and catalyst is charged below about 4 pounds per cubic foot is desirable since this density range is too low to encompass dense bed systems which induce backmixing. Although conversion falls off with a decrease in inlet density to very low levels, it has been found the extent of aftercracking to be a more limiting feature than total conversion of fresh feed, even at an inlet density of less than about 4 pounds per cubic foot. At the outlet of the reactor the density will be about half of the density at the inlet because the cracking operation produces about a four-fold increase in moles of hydrocarbon. The decrease in density through the reactor can be a measure of conversion.

The above conditions and description of operation are for the preferred fluid bed riser cracking operation. For cracking in the older conventional fluid bed operation or in a fixed-bed operation, the particular reaction conditions are well known in the art.

EXAMPLES

Additive A—Sepiolite Additive

A comparative additive (Additive A), prepared by the Ketjen Corp. was prepared composed of 80 Wt % Spanish sepiolite in 20 Wt % proprietary binder in a manner similar to Additive B.

Additive B—Preparation of Dolomite/ Sepiolite Additives

A calcium/magnesium-containing material useful for this invention was prepared using an aluminum hydroxy oligomer as the binding agent 80 g of a 50 Wt % aqueous solution of aluminum chlor-hydroxy (Reheis Chemical) was dispersed in 500 ml of deionized water. To this was added 160 g (dry basis) of crushed Spanish sepiolite (Tolsa) with high shear, followed by 200 g crushed dolomite again with high shear. The mixture thickened and was diluted back to about 36% solids by the addition of 150 ml of addition water, and allowed to stir for two hours at ambient conditions. The resultant slurry was then converted to microspheroidal form using a laboratory sized spray-drier (Yamato). The powder was dried at 250° F. in a vacuum oven, and then reslurried in one liter of 20% ammonium hydroxide solution for 15 minutes at 80° C. The slurry was filtered and the process repeated. Resultant filter cake was further water washed and dried at 250° F., and subsequently calcined at 1000° F. The material was lightly crushed to break up aggregates and sieved to 100/325 mesh, and designated Additive B. A similar batch of material was reproduced as Additive B', These additives were 50% dolomite, 40% sepiolite, and 10% binder, and on an oxide basis contained only 29 wt.% calcium, 29 wt.% magnesium, and 32 wt. % silicon.

Additive I—Preparation of Dolomite/Kaolin Additive

Additive I was prepared using the method of Additive B, with sepiolite replaced by kaolin. Additive I was 50 wt. % dolomite, 40 wt. % kaolin, and 10 wt. % binder. Kaolin is a naturally-occurring hydrous aluminosilicate frequently used as a economic diluent and matrix component in FCC catalysts.

Catalysts

A number of catalyst systems containing the claimed additive are described to demonstrate utility for vanadium passivation. The catalyst inventory of each test catalyst system contained a mixture of commercial catalyst particles (designated catalyst 1, 2, etc.) along with discrete, vanadium passivation particles (designated as additive A, B, B', or I). Each of the catalyst systems is accordingly identified by a label that corresponds to the last commercial catalyst together with the test additive, e.g. 1A, 1B, etc. Each system performance was compared to its respective, non-diluted commercial catalyst component.

Catalyst 1

Reference Catalyst 1 was DXB-150 (Davison Chemical Co.), a commercial FCC catalyst containing a partially rare earth stabilized zeolite in a modified silica sol matrix having about 35 wt. % total alumina (zeolite) content.

Catalysts 1A, 1B, 1B', and 1I

Admixtures of 80 Wt% of DXB-150 (Catalyst 1) intimately blended with 20 % of the additives A, B, B', and I were prepared These catalysts are designated 1A, 1B and 1B', and 1I, respectively.

Each catalyst admixture was heat shocked by placing in a preheated oven at 1100° F. (593° C.) for one hour. Then the catalysts were poisoned with 5000 ppm of vanadium by impregnation with vanadium naphthanates, followed by calcination at 1000° F. (538° C.) for 10 hours. The resulting catalyst was steam treated at 1450° F. (788° C.) with 95% steam and 5% nitrogen for 5 hours.

Catalysts 2, 2A and 2B

The reference catalyst (Commercial Catalyst 2) used in this test was OCTACAT D, an octane-enhancing cracking catalyst containing an ultra-stabilized hydrogen "Y" zeolite in an alumina sol generated matrix. OCTACAT D is sold by Davison Chemical Co.

Catalysts 2A and 2B are 80:20 blends of this reference catalyst with sepiolite and with dolomite/sepiolite, additives A and B, respectively.

Test Procedure L

Catalyst samples 1, 1A, 1B, 1B', and 1I were tested in a micro-activity test at 960° F. (516° C.) reaction temperature, 32 weight hourly space velocity (WHSV), 37 seconds contact time, and a catalyst to oil ratio of 3.,0 with 4.0 grams of catalyst. The charge stock was a gas-oil having a boiling range as characterized in Table I below.

TABLE I

| GAS OIL INSPECTIONS | |
|---|---|
| Stock Identification | Feedstock No. 1 |
| Inspections: | |
| Gravity | 23.5 |
| Pour Point, API | 85 |
| Nitrogen, Wt. % | 0.16 |
| Basic Nitrogen, ppm | 311 |
| Sulfur, Wt. % | 0.17 |
| RAM Carbon | 0.3 |
| Aniline Point, °F. | 181.5 |
| Nickel, ppm | 0.7 |
| Vanadium, ppm | 0.23 |
| Distillation, GC Sim Dist. | |
| 10 Pct. Cond. | 626 |
| 30 Pct. Cond. | 738 |
| 50 Pct. Cond. | 803 |
| 70 Pct. Cond. | 869 |
| 90 Pct. Cond. | 977 |
| EP | 1052 |

The results obtained for the reference catalyst and each catalyst poisoned with 5000 ppm of vanadium are presented below in Table II. Feed conversion was either maintained or improved, with betterment in yield structure, i.e., increased gasoline yield and, decreased coke and hydrogen make for the cases where the commercial catalyst was diluted with 20% vanadium trap, which are catalytically inert particles. Moreover the Catalysts 1B and 1B', where the sepiolite was combined with dolomite gave particularly significant improvements (27% increase in kinetic activity with additional selectivity gains) gave particularly significant improvements. When dolomite was dispersed in kaolin, rather than sepiolite, the performance was substantially inferior. Thus the combination of dolomite with sepiolite gives superior vanadium passivation to either dolomite or sepiolite employed as a separate entity.

TABLE II

| | Catalytic Cracking of Feed 1[(1)] | | | | |
|---|---|---|---|---|---|
| | | Commercial | | | |
| Catalyst | Catalyst 1 | 1A | 1B | 1B' | 1I |
| Additive | None | A | B | B' | I |
| Vanadium, ppm: | | | 5000 | | |
| Conversion, Wt % | 49 | 50 | 55 | 55 | 41 |
| Kinetic Act. | 0.96 | 1.0 | 1.22 | 1.22 | 0.70 |
| Relative Act. | 1.0 | 1.04 | 1.27 | 1.27 | 0.72 |
| Yields, Wt % | | | | | |
| C5-430 | 37 | 38 | 43 | 43 | 34 |
| Carbon | 4.0 | 3.5 | 3.2 | 2.9 | 2.0 |
| Hydrogen | 0.53 | 0.44 | 0.24 | 0.23 | 0.18 |
| Selectivity[(2)] | | | | | |
| C5-430 | 0.76 | 0.76 | 0.78 | 0.77 | 0.82 |
| Carbon | 0.081 | 0.071 | 0.058 | 0.052 | 0.049 |
| Hydrogen | 0.0109 | 0.0088 | 0.0044 | 0.0041 | 0.0044 |

[(1)]Using test procedure L
[(2)]Per Unit of Conversion.

Test Procedure M

Vanadium impregnation coupled with hi9h temperature steam deactivation, as in Test Procedure L is a particularly rigorous screening for vanadium passivation. However, it is a "worst case" scenario since it tends to cause most of the vanadium present to become reactive. In practice, it is believed that only a portion of the vanadium contaminant is an active poison. Accordingly, catalyst mixtures were tested under conditions that provide a better simulation of commercial practice.

Test Procedure M steam deactivates the test catalyst inventory (1450° F., 5 hours) prior to contacting with a vanadium contamination feed in a fixed-fluidized bed, cyclic reactor (FFBC). This evaluation technique permits the catalyst inventory to age and equilibrate in a repetitive cyclic environment consisting of: cracking (930° F.), steam-stripping (900° F.), and regeneration (1400° F.). The aging took place over 70 cycles, during which vanadium was deposited on the catalyst by doping the feedstock with an appropriate amount of vanadium naphthanate at a catalyst to oil ratio of 15. Vanadium-on-catalyst was ascertained by subsequent analysis (X-ray fluorescence). Catalysts poisoned in this manner were then evaluated by the micro-activity test described in Test Procedure L. In this particular instance the gas-oil described in Table III was employed.

Catalytic evaluations of the vanadium contaminated catalysts 2, 2A and 2B using Test Procedure M are tabulated in Table IV below. Vanadium-on-cat levels were close to, or exceeded, the target of 4000 ppm. Under these test conditions Reference catalyst 2 was severely deactivated relative to vanadium free catalyst. However, Catalyst 2B showed a 20% higher relative activity than the reference catalyst, even though the net zeolite content was diluted by 20%. Moreover this was achieved at a higher level of vanadium, 4700 ppm versus 3800 ppm. Improved selectivity i.e., increased gasoline yield and, decreased carbon and hydrogen were likewise noted.

TABLE III

| GAS OIL INSPECTIONS | |
|---|---|
| Stock Identification | Feedstock No. 2 |
| Inspections: | |
| Gravity | 24.3 |
| Nitrogen, Wt. % | 0.10 |
| Basic Nitrogen, ppm | 210 |
| Sulfur, Wt. % | 0.33 |
| RAM Carbon | 0.17 |
| Aniline Point, °F. | 185.8 |
| Distillation, D 1160 Dist. | |
| 10 Pct. Cond. | 703 |
| 30 Pct. Cond. | 795 |
| 50 Pct. Cond. | 872 |
| 70 Pct. Cond. | 961 |
| 90 Pct. Cond. | 1098 |
| EP | 1256 |

Portions of the spent catalysts containing sepiolite or dolomite/sepiolite vanadium traps were examined by a scanning electron microprobe to determine metal profiles across catalyst particles. As indicated in Table IV, the dolomite/sepiolite additive contained in Catalyst 2B exhibited a 30:1 ratio for vanadium scavenging (Additive:Host) as compared to 3:1 for the sepiolite additive in Catalyst 2A. This greatly enhanced specificity for vanadium, vis-a-vis the commercial catalyst with or without a sepiolite additive is further evidence of the effectiveness of the instant sepiolite/dolomite additives.

TABLE IV

| Catalyst: | 2 | 2A | 2B |
|---|---|---|---|
| Additive | None | A | B |
| V, 70 Cycles[(1)] | 0.38% | 0.37% | 0.47% |
| MAT Conv., Wt %: | 43 | 41* | 48* |
| Rel. Activity | 1.0 | 0.9 | 1.2 |
| Yield, Wt %: | | | |
| C5-430 | 33 | 31 | 37 |
| LCO | 18 | 18 | 18 |
| Coke | 3.4 | 3.2 | 2.4 |
| H2 | 0.43 | 0.47 | 0.15 |
| V-Specificity | | 3:1 | 30:1 |

Additive:
[(1)]Using the Feed 1
**MAT: 960° F., 32 WHSV, 3 Cat/Oil, Feed 2

Test Procedure N

In FCC processing, a small portion of feedstock sulfur becomes entrained in catalytic coke and is eventually converted to sulfur oxides ($SO_2$, $SO_3$) under conditions of catalyst regeneration. Calcium and magnesium oxides such as might be derived from the decomposition of dolomite or their respective carbonates are among those materials that are sometimes used to selectively scavenge $SO_3$ off-gases. Thus it might be expected that competition from $SO_x$ pickup might diminish vanadium passivation.

Performance data from the previous Examples were obtained using a low sulfur gas-oil (0.17 Wt %). Therefore in order to determine the sulfur tolerance of the dolomite/sepiolite vanadium trap, a test was made using a different feed containing 0.82 Wt % sulfur. The feed was prepared by diluting Feed III containing sulfur (Table V) with a 50:50 wt. % decalin/hexadecane mixture to ensure flowability.

TABLE V

GAS OIL INSPECTIONS

| Stock Identification | Feedstock No. 3 |
|---|---|
| Inspections: | |
| Gravity | 15.6 |
| Pour Point, API | 90 |
| Nitrogen, Wt. % | 0.54 |
| Sulfur, Wt. % | 0.965 |
| RAM Carbon | 0.6 |
| Aniline Point, °F. | 142.8 |
| Nickel, ppm | 1.8 |
| Vanadium, ppm | 1.6 |
| Distillation, D 1160 Dist. | |
| 10 Pct. Cond. | 757 |
| 30 Pct. Cond. | 838 |
| 50 Pct. Cond. | 900 |
| 70 Pct. Cond. | 964 |
| 90 Pct. Cond. | 1080 |
| EP | 1216 |

Catalyst 2C and Additive C

The comparison involved Reference 2 Calalyst, Catalyst 2 B and Catalyst 2C. Catalyst 2C is an 80:20 dilution of OCTACAT D with a passivation agent made in a manner similar to Additive B, excepting that the dolomite and sepiolite raw materials were both micronized before formulation, and were not treated with ammonium hydroxide. This additive is designated Additive C.

TABLE VI

High Sulfur Feed[(1)]

| Catalyst | Reference 2 | Catalyst 2B | | Catalyst 2C |
|---|---|---|---|---|
| V WT %: | — | 0.34 | — | 0.34 | 0.35** |
| (70° Cycles)* | | | | | |
| MAT Conv. Wt % | 59 | 48 | 54 | 53 | 52 |
| Activity: | 1.45 | 0.92 | 1.16 | 1.13 | 1.07 |
| Rel. Act. | 1.00 | 0.63 | 0.80 | 0.78 | 0.74 |
| Yield, Wt %: | | | | | |
| C5-430 | 45 | 35 | 42 | 41 | 40 |
| Coke | 2.52 | 3.73 | 2.07 | 2.59 | 2.33 |
| H2 | 0.07 | 0.56 | 0.06 | 0.32 | 0.29 |
| Selectivity: | | | | | |
| C5-430 | 0.76 | 0.73 | 0.77 | 0.77 | 0.77 |
| Coke | 0.043 | 0.078 | 0.038 | 0.049 | 0.045 |
| H2 | 0.0012 | 0.0117 | 0.0011 | 0.0061 | 0.0056 |

[(1)]V Deposition Feed Contains 0.82% Sulfur.
**Separate Batch of Raw Material.

Inspection of the data presented in Table VI shows that high feed sulfur does not affect passivation performance. The same trends that were evident using Test Procedure M were confirmed. At 3400 ppm vanadium contamination, the reference catalyst (Catalyst 2) retained only 63 % of its original activity, whereas the catalysts with the additive of this invention retained better than 93% (Relative Activity 0.80→0.78 and 0.74). Improved yield structure was also maintained relative to the vanadium contaminated reference.

Test Procedure O

To test for sulfur tolerance under even more severe conditions, a Catalyst 2B was deliberately saturated with sulfur and then evaluated for vanadium passivation. Specifically, 0.25 wt. % of a CO promoter was added to Catalysts 2 and 2B and these mixtures were fluidized at 1250° F. for 6 hours with a gas stream composed of 1% $SO_2$ in air. After 4 hours, the $SO_2$ was observed to have "broken through", i.e. $SO_2$ was observed in the outlet gas. Catalysts 2 and 2B were then further equilibrated for an additional 100 cycles at 1250° F. with the 0.82% sulfur feed in the absence of of vanadium. After equilibration sulfur-on-catalyst was low, indicating that, although about ⅓ of the divalent ions might be associated with $SO_4^{--}$, the sulfation is reversible.

TABLE VI

| Catalyst | Reference 2 | Catalyst 2B |
|---|---|---|
| Equilibration Cycles | 100 | 100 |
| Vanadium Cycles | 70 | 70 |
| Vanadium, ppm | 3600 | 3900 |
| Conversion, Wt % | 49 | 51 |
| Kinetic Activity | 0.98 | 1.02 |
| Relative Activity | 1.00 | 1.04 |
| Yield, Wt % | | |
| C5-430 | 36 | 38 |
| Carbon | 3.5 | 2.5 |
| Hydrogen | 0.48 | 0.22 |
| Selectivity* | | |
| C5-430 | 0.73 | 0.76 |
| Carbon | 0.072 | 0.049 |
| Hydrogen | 0.0097 | 0.0045 |
| Hydrogen/CH4 | 1.21 | 0.78 |

*Per Unit of Conversion

The catalysts were then subsequently poisoned with the same vanadium spiked feed over 70 further cycles at conditions of the previous Examples. Results are displayed in Table VII above. Actual vanadium levels closely approached the desired range.

The data indicates that the reference catalyst was relatively immune to sulfur but exhibited essentially the same loss of activity on contact with vanadium as in the earlier example. The protected catalyst retained almost all of the earlier demonstrated passivation effect in spite of the fact that it contains known sulfur getters. Conversion was down slightly, but still better than the reference catalyst ⓇvⓇn though there is a 20% dilution in net zeolite content. Moreover the significant reductions in coke- and hydrogen make are still very evident, along with the increased selectivity to gasoline. Thus the data strongly supports the conclusion that sulfur does not significantly interfere with passivation performance.

Additives 1D, 1E, 1F and 1G

The vanadium trap that has been described thus far consists of 50% dolomite dispersed in a sepiolite matrix using a 10 % binder. Additional studies were carried out where the impact of varying the dolomite to sepiolite ratio on vanadium passivation was measured. Additives were formulated and spray-dried according to the procedure of Example B. The dolomite:sepiolite ratio was varied from 30:60 Wt:Wt % in 10 % increments to a 70:20 ratio, all with 10% binder. The additives were then blended with the commercial cracking catalyst, Catalyst 1, at a 20 % dilution.

The resultant catalysts are listed in Table VIII. Each of the formulations was MAT evaluated with and without a 5000 ppm vanadium doping (incipient wetness technique) following a 1450 F steam deactivation. Conversion data, kinetic activities, and activity relative to the undiluted reference catalyst are also presented. Inspection of the table reveals that catalysts containing the dolomite/sepiolite additives have similar fresh Conversions (activities), albeit they do represent a dilution of the host catalyst's metal-free activity. However, at 5000 ppm vanadium, all of the catalyst containing dolomite/sepiolite are more active than the reference per se, and all retain a significantly higher, reasonably uniform portion of their initial activity. Hence the ratios of dolomite:sepiolite studied, catalyst activity and vanadium poisoning is not a problem.

Table VIII also illustrates the impact of changing the dolomite sepiolite ratio on the physical properties of the additive combinations. The data reported is for microspheres which have all been calcined, but not steamed.

As the dolomite content of the additive increases from 30 to 70%, there is a linear decrease in surface area, which accompanied by a corresponding non-linear increase in apparent bulk density. Likewise over the same range studied, pore volume declines at higher dolomite content, but the mean pore diameter changes very little.

TABLE VIII

| Catalyst | Reference 1 | 1D | 1E | 1B | 1F | 1G |
|---|---|---|---|---|---|---|
| Additive: | None | D | E | B | F | G |
| Dolomite % | 0 | 30 | 40 | 50 | 60 | 70 |
| Sepiolite % | 0 | 60 | 50 | 40 | 30 | 20 |
| Binder % | 0 | 10 | 10 | 10 | 10 | 10 |
| Fresh Steamed Deactivation (Zero Vanadium): | | | | | | |
| Conversion, St % | 66 | 59 | 61 | 58 | 60 | 59 |
| Kinetic Activity | 1.97 | 1.41 | 1.59 | 1.46 | 1.47 | 1.42 |
| Steam Deactivation with 5000 ppm Vanadium: | | | | | | |
| Conversion, Wt % | 49 | 53 | 55 | 55 | 55 | 53 |
| Kinetic Activity | 0.94 | 1.12 | 1.12 | 1.22 | 1.22 | 1.13 |
| Relative Activity[2] | 0.48 | 0.79 | 0.77 | 0.85 | 0.83 | 0.80 |
| Selectivity[1] | | | | | | |
| C5-430 | 0.76 | 0.78 | 0.78 | 0.78 | 0.78 | 0.79 |
| Carbon | 0.084 | 0.056 | 0.53 | 0.052 | 0.053 | 0.052 |
| Hydrogen | 0.0107 | 0.0036 | 0.0034 | 0.004 | 0.0039 | 0.0044 |
| Hydrogen/CH4 | 1.51 | 0.67 | 0.66 | 0.71 | 0.72 | 0.55 |

[1]Per unit conversion
[2]Kinetic activity at 5000 ppm V ÷ kinetic activity at 0 ppm V.

This data has important implications in terms of manufacturing flexibility. Dolomite is an inexpensive, ubiquitous, abundant mineral, hence if used at higher loadings it can opportunely affect additive manufacturing cost. Enhanced dolomite content also improves particle average bulk density (ABD) which is important for additive retention and fluidization in an operating FCC unit. It needs be mentioned that this data was obtained using a small laboratory sized spray dryer. Commercial experience indicates that with the higher drying temperatures and longer residence times available in commercial dryers, particles with further improvements in particle integrity are likely to be realized. Thus, in summary, the dolomite:sepiolite ratio can be manipulated over the range studied for cost or physical property enhancement without impeding catalytic or vanadium passivation activity.

Example 1

Variation of Additive Content

Because of its high efficiency for scavenging vanadium, the instant invention can be utilized at reasonably low levels in terms of percent of catalyst inventory. This is illustrated in Table IX. Commercial Catalyst 1 was again employed as the active host catalyst and was diluted/blended with Additive B at levels ranging from 2 to 20 %. Portions of these blends were steam deactivated at 1450 F and MAT evaluated under conditions previously stated. The remaining materials were each poisoned with 5000 ppm vanadium (incipient wetness), steam deactivated, and also MAT evaluated (per Test Procedure L).

TABLE IX

| | Fresh. Steam Deactivated Catalyst | | | | | | |
|---|---|---|---|---|---|---|---|
| Catalyst 1: Wt % | 100 | 96 | 95 | 92.5 | 90 | 85 | 80 |
| Additive B Wt % | 0 | 2 | 5 | 7.5 | 10 | 15 | 20 |
| MAT Conv. WT %: | 65 | 64 | 63 | 62 | 60 | 60 | 59 |
| Activity:* | 1.84 | 1.79 | 1.70 | 1.65 | 1.49 | 1.51 | 1.46 |
| | 5000 ppm V | | | | | | |
| MAT Conv. WT % | 49 | 51 | 55 | 55 | 52 | 53 | 55 |
| Activity | 0.94 | 1.06 | 1.23 | 1.21 | 1.09 | 1.13 | 1.2 |
| Relative Activity[1] | 0.51 | 0.59 | 0.72 | 0.73 | 0.73 | 0.75 | 0.85 |
| C5-430: | 37 | 40 | 43 | 43 | 41 | 42 | 43 |
| H2: | 0.52 | 0.33 | 0.30 | 0.25 | 0.24 | 0.23 | 0.23 |
| Coke: | 4.1 | 3.4 | 3.1 | 3.1 | 2.8 | 3.0 | 2.9 |
| H2/CH4 | 1.52 | 1.0 | 0.83 | 0.86 | 0.78 | 0.73 | 0.66 |

[1]Kinetic activity at 5000 ppm V/kinetic activity at 0 ppm V.

The data in Table IX for the fresh, steam deactivated catalysts in the absence of vanadium show the expected decline in activity as a function of dilution level, since the dolomite:sepiolite in its own right has negligible cracking activity. On the other hand, at 5000 ppm vanadium, the presence of as little as 2 % additive B begins to impart some vanadium tolerance, i.e., relative activity retention approaches 60% as compared to 50% for the unprotected commercial catalyst. This is accompanied with attendant improvements in yield—enhanced gasoline yields, and a drop in carbon and hydrogen production. Activity and yield improvements continue until above 5% whereupon they tend to line out.

This ability to maintain unit performance at low levels of addition allows the passivation agent to become more cost effective. Thus, when used in conjunction with conventional cracking catalysts, a smaller loss of front end catalyst activity is expected than would be encountered with previous passivation technologies.

Test Procedure P

Additive content data has also been obtained with catalysts that have been FFBC aged in the presence of vanadium in order to examine them with a truer simulation of the FCC process (4000 ppm vanadium, 50 cycles, 1030 F reactor, 1400 regenerator). The catalysts were formulated by diluting a Catalyst 3, very high zeolite containing microspheroidal material, to a net 35 % ultra-stable "Y" content, using as diluents various amounts of dolomite:sepiolite Additive 1B', augmented with a third additive, which was an inert material having little passivation ability. Each of the component materials was individually steam deactivated at 1450 F, prior to blending. The particular batch of dolomite:sepiolite used was additive H, made by a larger scale preparation of Additive B.

The results are listed in Table X. As level of addition of the passivating agent is increased, there is a corresponding increase in conversion and kinetic activity compared to the unprotected reference catalyst. Gasoline yield also rises, whereas coke and hydrogen production, and hydrogen to CH4 ratios decline indicating that vanadium's secondary dehydrogenation activity is being mitigated.

A general overall increase in conversion was noted in these tests when comparing the host catalyst and catalyst systems containing the additive (as compared to the earlier example with impregnated vanadium). One of the reasons is that the fresh catalyst activity also increases. In terms of preservation of initial activity, the passivated catalysts average about 85%, while the host catalyst retains 77%. The reason for the more subtle effects observed in this cyclic deposition series, is that only part of the vanadium participates in the vapor transfer poisoning mechanism. Thus these data better mimic actual commercial practice. Vanadium deposition by the incipient wetness and subsequent steaming tends to exaggerate the vapor transfer effect, causing more substantial catalyst deactivation than would actually be experienced.

TABLE X

| Catalyst 3, Wt % (plus inert) | 100 | 97 | 95 | 90 | 80 |
|---|---|---|---|---|---|
| Additive H, % | 0 | 3 | 5 | 10 | 20 |
| Vanadium, ppm | | | 4000* | | |
| Conversion, Wt % | 43 | 45 | 45 | 47 | 50 |
| Activity | 0.76 | 0.84 | 0.81 | 0.88 | 1.01 |
| Yield: | | | | | |
| C5-430 | 32 | 35 | 34 | 36 | 39 |
| Carbon | 3.7 | 3.7 | 3.4 | 3.1 | 2.8 |
| Hydrogen | 0.60 | 0.53 | 0.48 | 0.41 | 0.28 |
| Selectivity:** | | | | | |
| C5-430 | 0.76 | 0.76 | 0.77 | 0.77 | 0.78 |
| Carbon | 0.0875 | 0.0825 | 0.0756 | 0.0665 | 0.0551 |
| Hydrogen | 0.0140 | 0.0117 | 0.0107 | 0.0089 | 0.0056 |
| Hydrogen/CH4 | 1.23 | 1.11 | 1.03 | 0.89 | 0.65 |

*Vanadium is reported at nominal value, actual vanadium-on-cat data not yet available.
**Per Unit of conversion.

Additive G

Sepiolite, a principal component of the instant invention, is a hydrous, crystalline magnesium silicate classified as a member of the palygorskite family of minerals. Attapulgite also belongs to this mineral class. It is similar to sepiolite in its mineralogical attributes, but differs in unit cell size and ultimate particle dimensions. Frequently attapulgite samples show partial replacement of magnesium by some aluminum or iron. Quality deposits of attapulgite in commercial quantities are indigenous to the United States (Georgia) and are available at lower cost than sepiolite. Consequently, an additive formulation was evaluated wherein attapulgite was substituted for sepiolite.

Additive G was formulated (50% dolomite/40% attapulgite/10% binder) according to the recipe for Additive B using a commercial grade of attapulgite (Diluex FG, Floridin Co.) as a replacement for sepiolite. Three catalysts, were formulated to the same 35% ultra-stable "Y" zeolite content using the same materials and procedures as described to make Catalyst 3B. Catalyst 3 has no vanadium trap and serves as the reference catalyst. Catalyst 3H contains dolomite/sepiolite (Additive H), and catalyst 3G contains the dolomite/attapulgite particles, (Additives G), each at the 20 Wt % level.

The catalysts were each tested at three different vanadium levels deposited over 50 cycles using the FFBC aging conditions cited in the Test Procedure M, Feed 1. A 50 cycle reference point in the absence of vanadium was also obtained. Pertinent results are listed in Table XI.

TABLE XI

| Catalyst | 3 | | | |
|---|---|---|---|---|
| Additive | None | | | |
| Vanadium, ppm* | 0 | 1000 | 3000 | 4000 |
| Conversion, Wt % | 49 | 51 | 45 | 43 |
| Activity | 0.98 | 1.03 | 0.82 | 0.76 |

TABLE XI-continued

| Selectivity:** | | | | |
|---|---|---|---|---|
| C5-430 | 0.79 | 0.77 | 0.77 | 0.76 |
| Coke | 0.0348 | 0.0579 | 0.0760 | 0.0875 |
| Hydrogen | 0.0020 | 0.0062 | 0.0113 | 0.0140 |
| Hydrogen/CH4 | 0.27 | 0.70 | 1.08 | 1.23 |
| Catalyst | H | | | |
| Additive | 20 Wt % "H" {50% dolomite/ 40% sepiolite/10% binder} | | | |
| Vanadium, ppm* | 0 | 1000 | 3000 | 4000 |
| Conversion, Wt % | 51 | 49 | 50 | 50 |
| Activity | 1.04 | 0.94 | 1.02 | 1.01 |
| Selectivity:** | | | | |
| C5-430 | 0.78 | 0.78 | 0.78 | 0.78 |
| Coke | 0.0407 | 0.0435 | 0.0495 | 0.0551 |
| Hydrogen | 0.0018 | 0.0038 | 0.0050 | 0.0056 |
| Hydrogen/CH4 | 0.24 | 0.46 | 0.60 | 0.65 |
| Catalyst | 3G | | | |
| Additive | 20 Wt % "G" {50% dolomite/ 40% attapulgite/10% binder} | | | |
| Vanadium, ppm* | 0 | 1000 | 3000 | 4000 |
| Conversion, Wt % | 49 | 51 | 49 | 48 |
| Activity | 0.97 | 1.03 | 0.95 | 0.92 |
| Selectivity:** | | | | |
| C5-430 | 0.79 | 0.79 | 0.79 | 0.79 |
| Coke | 0.0375 | 0.0382 | 0.0445 | 0.0511 |
| Hydrogen | 0.0016 | 0.0029 | 0.0042 | 0.0048 |
| Hydrogen/CH4 | 0.31 | 0.39 | 0.52 | 0.55 |

*Nominal values, actual vanadium-on-cat currently not available.
**Per Unit of Conversion.

Catalyst 3, the unprotected catalyst, shows a rapid fall off in conversion and selectivity as vanadium levels increase. Catalysts 3H and 3G, on the other hand, exhibit very little conversion or gasoline loss over the same range, and increases in coke and hydrogen make are very much lower. Of equal importance, is the fact that the data for Catalysts 3H and 3G which are very similar, show that sepiolite and attapulgite in combination with dolomite both give good performance.

What is claimed is:

1. A fluid catalytic cracking particle comprising the following components:
   (a) a component selected from the group consisting of dolomite, substantial amorphous calcium magnesium silicate, calcium magnesium oxide, calcium magnesium acetate, calcium magnesium carbonate, and calcium magnesium subcarbonate;
   (b) a carbonate comprising hydrous magnesium silicate; and
   (c) a binder selected from the group consisting of kaoline, bentonite, montmorillonite, saponite, hectorite, alumina, silica, titania, zirconia, silica-alumina, and combinations thereof;
   wherein said component (a) and said component (b) are present in a weight ratio of component (a) to component (b) from about 80:20 to about 20:80, and said binder comprises from about 5-30% by weight of said particle based on the total weight of said particle.

2. The particle as claimed in claim 1 wherein said component (a) comprises dolomite.

3. The particle as claimed in claim 1 wherein said hydrous magnesium silicate comprises material selected from the group consisting of sepiolite, attapulgite, palygorskite, talc, and amorphous synthetic sepiolite.

4. The particle as claimed in claim 1 wherein said ratio is from about 50:50 to about 70:30.

5. A circulatory inventory of catalyst particles in a fluid catalytic cracking process, wherein from 2 to 50 weight percent of said inventory is composed of particles of claim 1.

6. The inventory as claimed in claim 5 wherein said particles comprise from 3-20 weight percent of said circulating inventory.

7. The inventory as claimed in claim 6 wherein said particles comprise from 5-10 weight percent of said circulating inventory.

8. The particles as claimed in claim 1 wherein said particle further comprises antimony oxide or bismuth oxide.

* * * * *